United States Patent
Periasamy et al.

[11] Patent Number: 6,023,733
[45] Date of Patent: Feb. 8, 2000

[54] EFFICIENT PATH DETERMINATION IN A ROUTED NETWORK

[75] Inventors: Ravi Periasamy, Cary, N.C.; Gnanaprakasam Pandian, Cupertino, Calif.; Frank Gerard Bordonaro, Cary, N.C.; Ramin Naderi, Saratoga; Kushal A. Patel, Sunnyvale, both of Calif.

[73] Assignee: Cisco Technology, Inc., San Jose, Calif.

[21] Appl. No.: 08/961,355

[22] Filed: Oct. 30, 1997

[51] Int. Cl.[7] .................................................. G06F 13/00
[52] U.S. Cl. ............................................................ 709/241
[58] Field of Search ........................ 364/DIG. 1, DIG. 2; 709/200, 217, 218, 220, 221, 222, 223, 224, 227, 228, 232, 234, 235, 239, 242, 249, 252

[56] References Cited

U.S. PATENT DOCUMENTS 5,606,669  2/1997  Bertin et al. ............................ 709/224

Primary Examiner—Robert B. Harrell
Attorney, Agent, or Firm—Cesari and McKenna, LLP

[57] ABSTRACT

The topology of a computer network is represented, for each routing device in the network, as a tree structure with the root of the tree designating the particular routing device. Tree nodes represent LANs, while arcs connecting the nodes represent other routing devices. Thus, the number of first-level links to children off the root is equal to the number of LANs connected to the source routing device, and those first-level links point to nodes representing the LANs (or LAN segments) directly connected to the source routing device. As a result of this representation, each routing device can store a representation of the entire network adequate to facilitate routing, but with much less memory utilization than a list of addresses. Furthermore, because the network is represented at a more general level than that of individual station addresses, changes to the topology of the network can be readily introduced without the need for extensive (e.g., address by address) reconfiguration.

16 Claims, 5 Drawing Sheets

EFFICIENT PATH DETERMINATION IN A ROUTED NETWORK

BACKGROUND OF THE INVENTION

A computer network is a geographically distributed collection of interconnected subnetworks for transporting data between stations, such as computers. A local area network (LAN) is an example of such a subnetwork consisting of a transmission medium, such as coaxial cable or twisted pair, that facilitates relatively short-distance communication among interconnected computers or "stations." The stations typically communicate by exchanging discrete packets or frames of data according to predefined protocols. In this context, a protocol denotes a set of rules defining how the stations interact with each other.

Most networks are organized as a series of hardware and software levels or "layers" within each station. These layers interact to format data for transfer between, e.g., a source station and a destination station communicating over the network. Specifically, predetermined services are performed on the data as it passes through each layer and the layers communicate with each other by means of the predefined protocols. This layered design permits each layer to offer selected services to other layers using a standardized interface that shields the other layers from the details of actual implementation of the services.

In an attempt to standardize network architectures, i.e., the sets of layers and protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each station of the network.

FIG. 1 illustrates a schematic block diagram of conventional protocol stacks 125 and 175 used to transmit data between a source station 110 and a destination station 150, respectively, of a LAN 100. Each protocol stack comprises a collection of protocols, one per layer, and is preferably structured according to the OSI seven-layer model. As can be seen, the protocol stacks 125 and 175 are physically connected through a communications channel 180 at the physical layers 124 and 164. For ease of description, the protocol stack 125 will be described.

In general, the application layer 12 contains a variety of protocol functions that are commonly needed by software processes, e.g., sending process 104, executing on the station, while the presentation layer 114 is responsible for the presentation of transmitted data in a meaningful manner to the application layer. The session layer 116, transport layer 118 and the network layer 120 are substantially involved in providing pre-defined sets of services to aid in connecting the source station to the destination station.

IEEE standard 802 defines a flexible network architecture oriented to the implementation of LANs. Although it generally conforms with the OSI model, the IEEE approach addresses only the lowest two layers of that model, the physical and data link layers. Specifically, the physical layer 124 is concerned with the actual transmission of signals across the communication channel; in this context, the physical layer defines the types of cabling, plugs and connectors used in connection with the channel.

The data link layer 122, on the other hand, is responsible for transmission of data from one station to another. In the IEEE 802 architecture, the data link layer is divided into two sublayers: logical link control (LLC) and media access control (MAC). The LLC sublayer 180 allows the overlying network layer to access the services of the LAN without regard to the actual network implementation; more specifically, the LLC layer initiates control signal interchange, organizes data flow, interprets commands and generates responses.

The MAC sublayer 182 is primarily concerned with controlling access to the transmission medium and, to that end, defines rules or procedures by which the stations must abide in order to share the medium. The MAC layer further provides addressing and framing functions, the latter including the addition of header and trailer information needed to identify the boundaries of frames and to synchronize communication between source and destination stations.

Data transmission over LAN 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted to the protocol stack 175 of the destination station 150, where they are passed up that stack to a receiving process 174. Data flow is schematically illustrated by solid arrows.

Although actual data transmission occurs vertically through the stacks, each layer is programmed as though such transmission were horizontal. That is, each layer in the source station 100 is programmed to transmit data to its corresponding layer in the destination station 150, as schematically shown by dotted arrows. To achieve this effect, each layer of the protocol stack 125 in the source station 110 typically adds information (in the form of a header field) to the data frame generated by the sending process as the frame descends the stack. At the destination station 150, the various encapsulated headers are stripped off one-by-one as the frame propagates up the layers of stack 175 until it arrives at the receiving process.

As noted, a significant function of each layer in the OSI model is to provide services to the other layers. One type of service offered by the layers is a "connectionless" transmission service where each transmitted packet carries the full address of its destination through the network. A key function of a routing device such as a bridge or a router is determining the next LAN or station to which the packet is sent. A bridge operates at the data-link level, connecting one or more LANs together (that is, facilitating the transfer of messages among the LANs connected to the bridge). A router operates at the network level and may span clusters of LANs. When the network layer receives a packet from the transport layer for transmission over the network, it encapsulates the packet with a header containing, inter alia, source and destination addresses. An example of a network layer protocol is the Internet (IP) network layer protocol.

Within a LAN, access is typically shared among the stations in accordance with various control methods depending upon the topology of the subnetwork and the type of transmission control employed. A popular subnetwork topology is a ring network that may be formed by configuring the communication channel as a loop and coupling the stations at intervals around the loop. The stations communicate by transmitting and receiving discrete signals in the form of data frames according to predefined protocols. Acceptance of a frame by each station, in turn, is determined on the basis of an address contained in the frame.

With LANs that employ a ring topology, a commonly used access control method is token passing. Token passing is a form of distributed transmission control wherein all the stations on the subnetwork cooperate in controlling access to the communication channel. Here, a small message or "token" is passed from one station to the next along the ring. If the token is marked as free, the station receiving it can transmit a message over the ring. A token ring network is an example of a ring topology that uses token passing as an access control method.

Token ring networks may be interconnected using routers and bridges that transfer frames between the rings. A route is the path—that is, the sequence of routing devices and intermediate LANs—a frame travels from a source station to a destination station, and is specified in the header of the frame. Frequently, a message can reach its destination over more than one path. In "source route bridging," it is the source station that typically determines the particular path the message is to follow, and writes that path into the header. Source-route bridges usually are also configured to handle frames lacking specific routes (i.e., "transparent" frames); such bridges are referred to as SR-TB bridges, and in these cases, the first bridge to receive the frame determines the path.

Unless the source or routing device has previously sent messages to the destination station, it generally must undertake a "route-discovery procedure" to identify the sole or optimal path the message is to travel. Once the source station has "discovered" this path to the destination, it caches the path for future use, and then transmits frames specifying the path and the address of the destination station onto the network.

In one common route-discovery procedure, the source station issues the frame as an "all-paths explorer" packet that is received by each station on the local ring subnetwork. Each routing device copies the frame and supplies information relating to the route (i.e., bridge and ring numbers) within its RI field; it then distributes the copy to all stations on its interconnected ring. Eventually, a copy of the broadcast explorer frame reaches every station on every LAN of the network. Each station may respond to the source by issuing a response frame containing its MAC address and the routing information. The source station examines the information contained in these response frames and selects (e.g., based on the round-trip time for return) a path to the intended destination. Routing devices along the path may also cache the path to the destination station.

In many instances, and depending on the network topology, the path the frame follows may not be determined by routing information contained in the frame itself. An example of such a topology involves "data link switching," or DLSw, which provides a forwarding mechanism across wide-area links. In traditional bridging, the data link connection is end-to-end, i.e., effectively continuous between communicating end stations; a frame originating on a source LAN traverses one or more bridges specified in the path over the LLC connection to the destination LAN. In a system implementing DLSw, by contrast, the LLC connection terminates at the first DLSw bridge or router. The DLSw device multiplexes the LLC connections onto a transport connection (usually a "transport-control protocol," or TCP connection) to another DLSw bridge or router. In this way, the individual LLC connections do not cross a wide-area network, thereby reducing traffic across this network; the LLC connections from the source LAN to the transmitting data link switch, and from the receiving data link switch to the destination LAN, are entirely independent from one another. Data link switching may be implemented on multiprotocol routers capable of handling DLSw as well as conventional (e.g., SRB) frames. The DLSw forwarding mechanism is well-known and described in detail in Wells et al., *Request for Comment (RFC)* 1795 (1995).

Because DLSw devices communicate with one another relatively autonomously (so that, for example, a receiving switch may be selected from among several candidates according to load-balancing or other network considerations), the ultimate routing path cannot be established at the source. Instead, each data link switch will build a set of tables listing the identities of each other switch capable of reaching a specific MAC address. As a consequence, search traffic is kept to a minimum, but expansion of the network imposes an increasing storage burden on DLSw devices.

Indeed, as the size of the network grows, the cache of paths and addresses each device accumulates to facilitate exchange of messages with other stations can increase exponentially. Even in modestly sized networks, this can require substantial storage capacity that raises costs and decreases performance, as routing times increase with the size of the path table. Moreover, because stations can be swapped among LANs and entire LANs eliminated or rerouted, the paths must be updated or removed relatively frequently. Once again, these operations become burdensome as network size increases.

SUMMARY OF THE INVENTION

In accordance with the present invention, the amount of storage necessary to maintain a complete "picture" of the network topology (for purposes of transmitting frames) is substantially reduced. Rather than requiring separate entries corresponding to individual paths between a routing device and every possible destination station, the present invention provides a tree structure that represents the topology of the network at an optimal level of generality. The invention exploits the fact that in a LAN environment, it is usually unnecessary to specify the precise address of a station in order to ensure delivery of a frame to that station. Instead, it is sufficient to specify the LAN, since entry of the message onto the LAN typically ensures its broadcast to all connected stations.

In accordance with the invention, the topology of the network is represented, for each routing device, as a tree structure with the root of the tree designating the routing device. Tree nodes represent LANs, while arcs connecting the nodes represent other routing devices. Thus, the number of first-level links to children off the root is equal to the number of LANs connected to the source routing device, and those first-level links point to nodes representing the LANs (or LAN segments) directly connected to the source routing device. As a result of this representation, each routing device can store a representation of the entire network adequate to facilitate routing, but with much less memory utilization than a list of addresses. Furthermore, because the network is represented at a more general level than that of individual station addresses, changes to the topology of the network can be readily introduced without the need for extensive (e.g., address by address) reconfiguration.

Accordingly, in a first aspect, the invention comprises a method of defining communication pathways in a computer network including a plurality of multicast subnetworks and a plurality of routing devices (bridges and/or routers) connecting the subnetworks and defining routing paths thereamong. The method comprises storing, in a routing device, a data structure representing a tree-structured network topology that defines pathways to at least some of the subnetworks. The topological network representation captured in the data structure specifies a root designating the source routing device, a plurality of nodes each designating a subnetwork connected to the routing device, and a plurality of arcs connecting the nodes, each arc corresponding to a different routing device capable of transferring packets between the subnetworks designated by the nodes spanned by the arc.

In a second aspect, the method further comprises causing frames to be routed in accordance with the data structure. The packets each comprise a header having a destination field; routing is accomplished by determining (from the destination field) a destination subnetwork, and selecting a routing path from the source routing device to the destination subnetwork in accordance with the data structure. The routing device transmits the packet onto the network in a manner that causes the packet to traverse the routing path.

In another aspect, the invention allows a routing device to determine multiple paths to the destination station and, based on one or more criteria, to select an optimal path. For example, it may be possible for a routing device to query other devices to determine their traffic loads; in this way, the routing device can select an optimal route based on shortest expected time to destination, or may balance loads across redundant paths.

In a further aspect, the stored network topology can be used to characterize the network for purposes of analysis (e.g., to determine the complete end-to-end path through the network), or to ensure that the topology remains free of loops.

In still another aspect, the invention comprises appropriate hardware and software components to implement the foregoing.

BRIEF DESCRIPTION OF THE DRAWINGS

The invention description below refers to the accompanying drawings, of which.

DETAILED DESCRIPTION OF THE PREFERRED EMBODIMENTS

Figure 1:
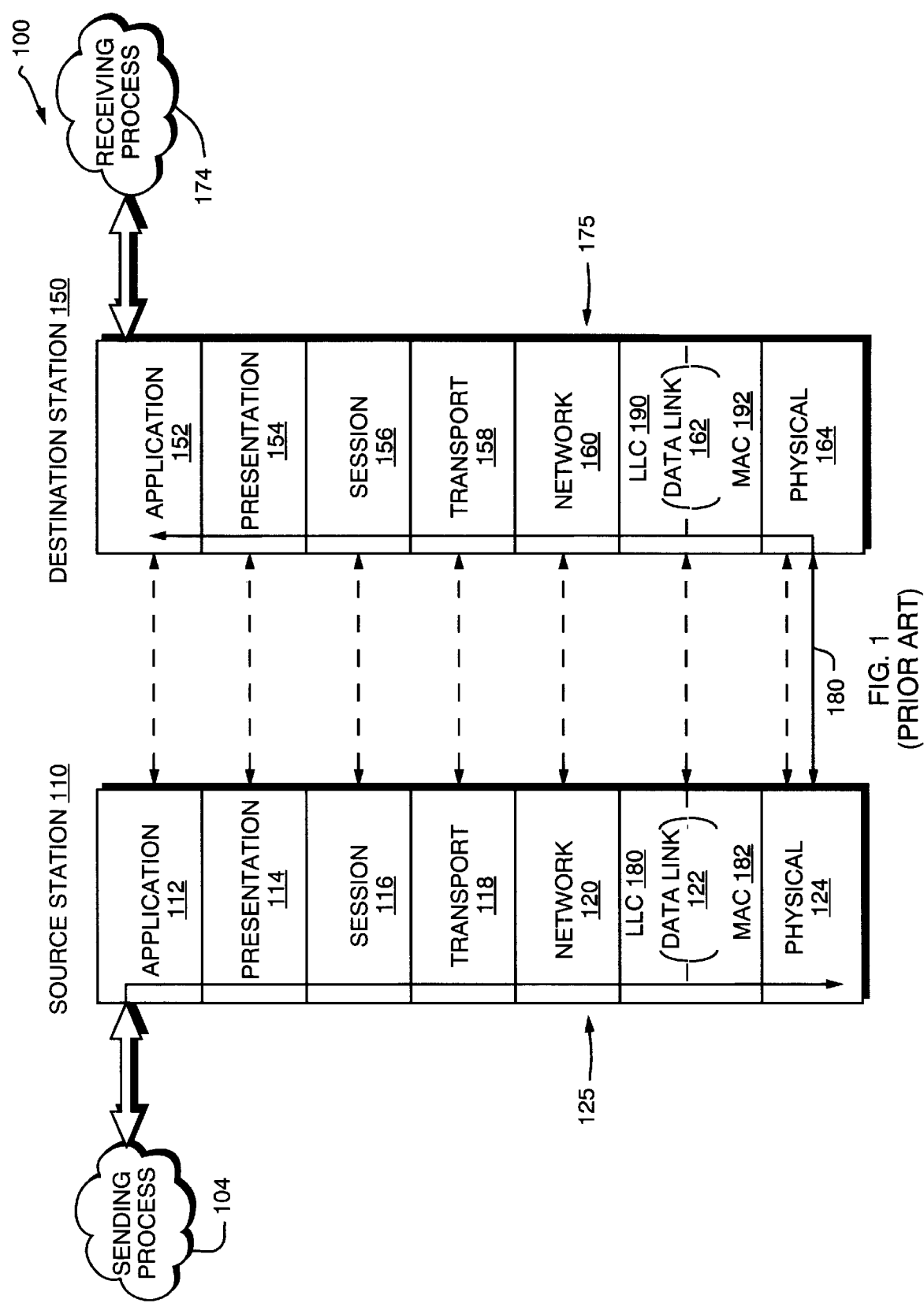
FIG. 1 is a schematic block diagram of prior-art protocol stacks used to transmit data between a source station and a destination station of a computer network.
Figure 2A:
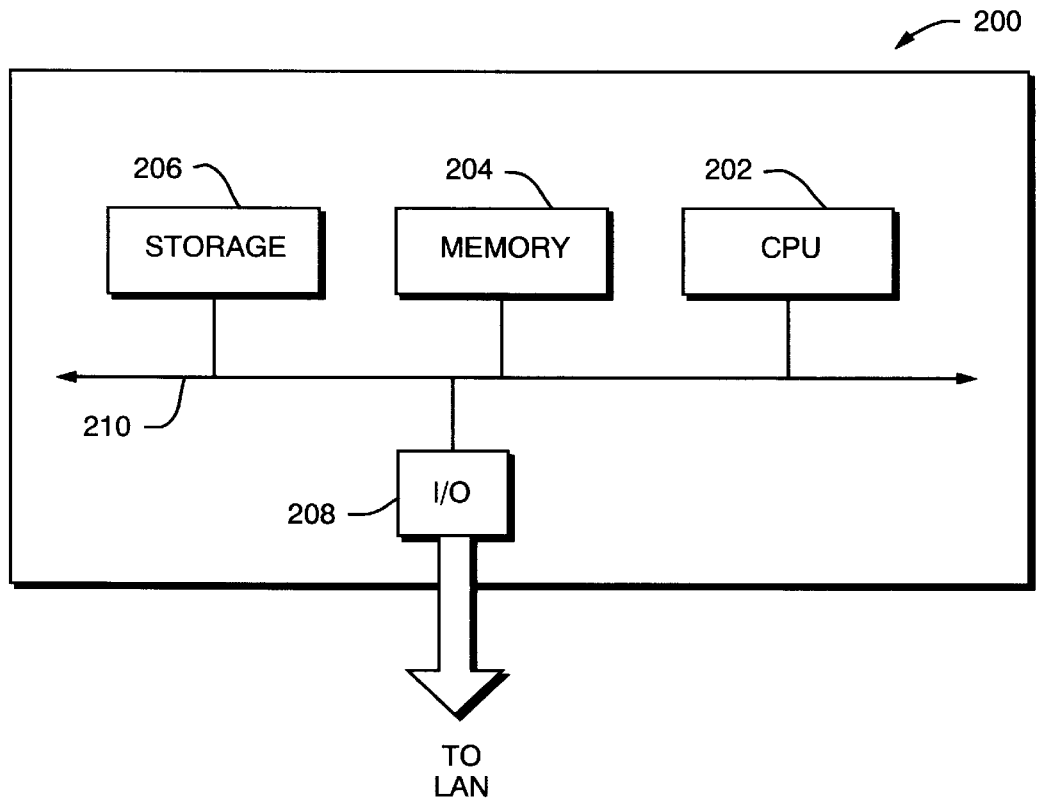
FIG. 2A schematically illustrates the primary components of a representative network station.
Figure 2B:
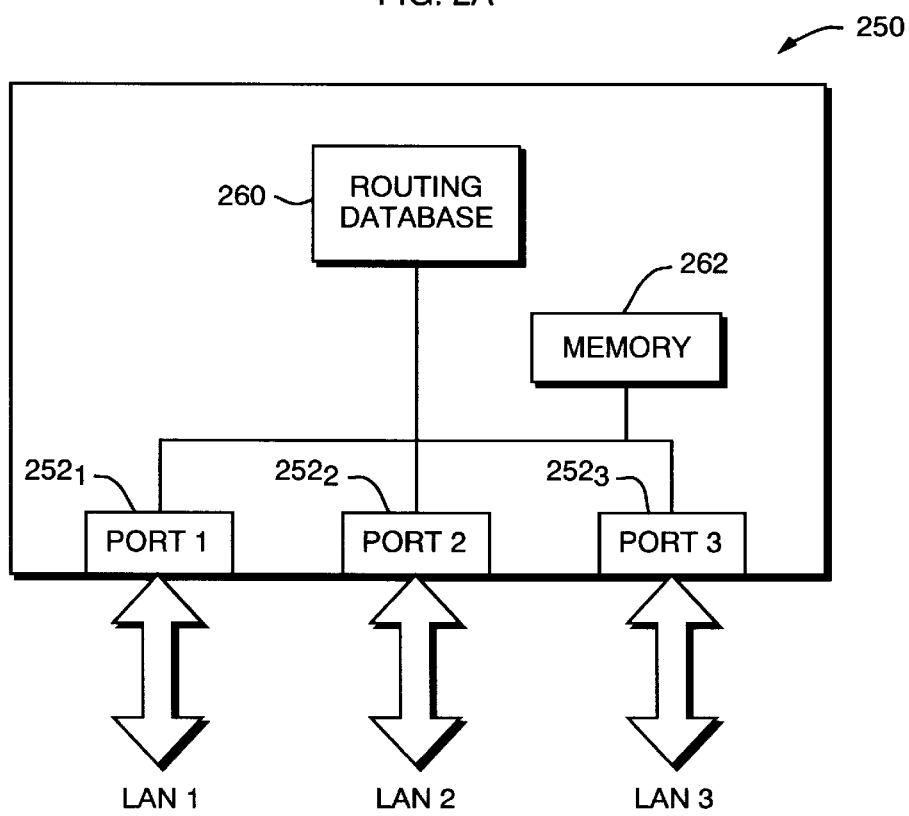
FIG. 2B schematically illustrates the primary components of a representative routing device.
Figure 3:
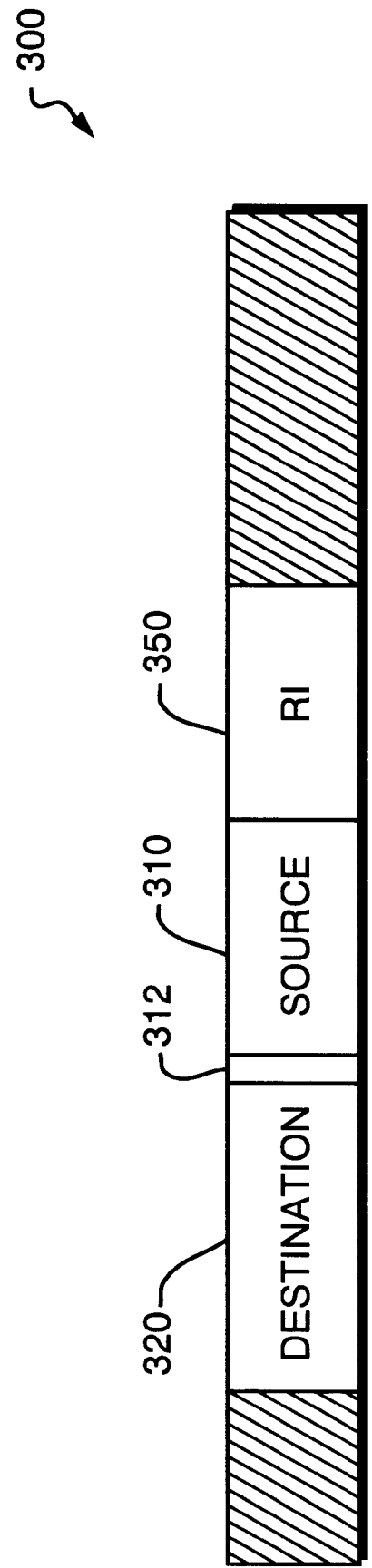
FIG. 3 schematically depicts the format of a network frame or packet having a routing information field.

The general environment of the invention is illustrated in FIGS. 2–4, which illustrate, respectively, the components of a representative station on a computer subnetwork; the components of a representative routing device; the format of a conventional token-ring frame containing routing information; and the manner in which stations, such as that shown in FIG. 2A, are organized into a network topology that may be mapped in accordance with the present invention.

With reference to FIG. 2A, the station 200 on a computer subnetwork typically comprises a conventional central processing unit (CPU) 202, a memory unit 204, a permanent storage device 206, and an input/output (I/O) unit 208, all interconnected by (and communicating over) a bidirectional system bus 210. Memory unit 204 ordinarily comprises storage locations implemented as volatile random-access memory (RAM) and permanent read-only memory (ROM) devices, which are addressable by CPU 202 and I/O unit 208. An operating system, resident on the permanent components of memory 204 and on storage device 206, is executed by CPU 202 to support user-selected computer applications and facilitate network communications. Not shown are the display and input devices (a keyboard, mouse, etc.) that facilitate interaction with a user.

I/O unit 208 connects station 200 to a local subnetwork, which may also be connected to one or more routing devices that connect the subnetwork to other subnetworks. As shown in FIG. 2B, a routing device 250 may comprise a series of ports $252_1$, $252_2$, $252_3$, each connected to a different subnetwork, a routing database 260, and a memory module 262. Conventionally, routing database 260 contains a "station cache" that associates the various stations on the network with one of the ports 252.

Station 200 transfers onto the network information organized into frames, which are analyzed by routing device 250 to determine whether transfer to another subnetwork is necessary. FIG. 3 shows the organization of a representative frame according to IEEE Standard 802. Typically, the frame 300 contains, inter alia, a source-address (SOURCE) field 310 identifying the station sending the frame. A first bit field 312 of the source address is preferably used to identify whether routing information is contained in the frame. In addition, a destination-address (DESTINATION) field 320 identifies the station or stations that should receive the frame 300. The remainder of the frame 300 includes the transmitted information carried by the frame.

When routing device 250 (which "listens promiscuously" to all frames placed on subnetworks to which it is connected) receives this frame, it caches the address and the port on which the frame was received in memory module 262. In conventional systems, routing device 250 consults routing database 260 for a match to the received address and, if the address if found in the database, routing device 250 forwards the frame to the port 252 linked with the address in the database. If the specified port is the one from which the frame was received, it is deleted.

LANs are ordinarily "multicast" networks, so that when a source station transmits a frame over the LAN, it is sent to all stations on that LAN. If the intended recipient of the frame is connected to another LAN, the frame is passed over a routing device to that other LAN. Again, in data link switching, routing of the frame between LANs is orchestrated by DLSw devices that communicate autonomously and establish appropriate paths among switches and, ultimately, to the destination LAN. As a result, in a DLSw network routing information always terminates at a data link switch, so each such switch may naturally be represented as the root of a routing tree in accordance with the invention (as set forth below).

Figure 4A:
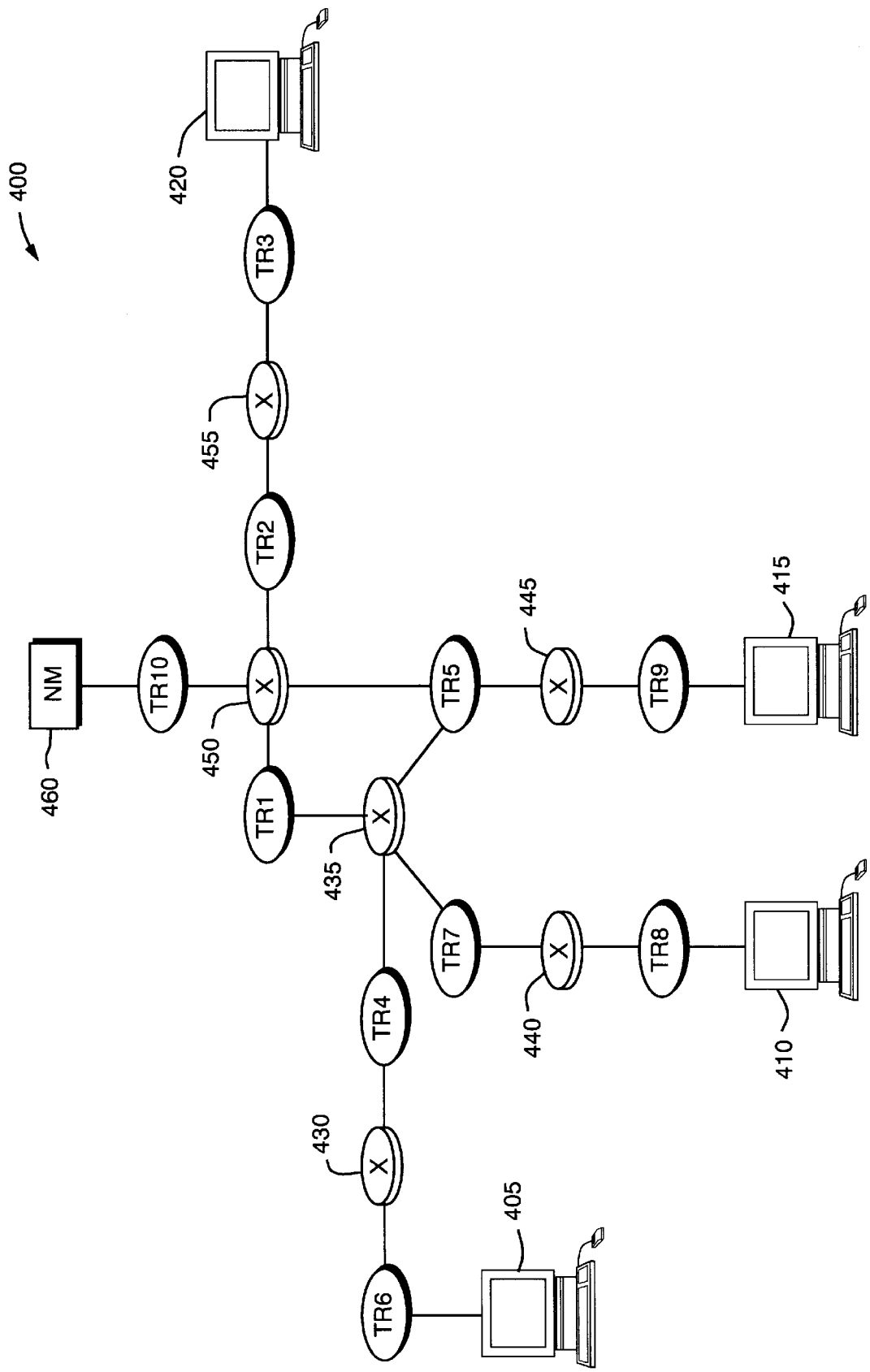
FIG. 4A is a block diagram of a collection of interconnected subnetworks of a computer network upon which the present invention may operate.

Refer now to FIG. 4A, which shows a representative network topology 400 comprising a collection of subnetworks interconnected by means of various routing devices. The subnetworks, labeled TR1–TR10, may be token-ring LANs. For explanatory purposes, four representative stations 405 (from LAN TR6), 410 (from LAN TR8), 415 (from LAN TR9), 420 (from LAN TR3) are illustrated, it being understood that these actually represent nodes on the ring to which they are connected (by means of their I/O units 208). In a DLSw network, each of the DLSw devices would contain the address of many (or every) other network station for routing purposes.

Subnetworks TR1–TR10 are interconnected by a series of routing devices 430, 435, 440, 445, 450, 455. Communication among the stations coupled to the subnetworks TR1–TR10 is typically effected by exchanging discrete data frames specifying addresses of, e.g., source and destination stations. In the illustrated embodiment, routing devices 430–455 are bridges (e.g., multiprotocol devices implementing DLSw); alternatively, however, the subnetworks may represent network clusters, and the routing devices may comprise routers. Each routing device 430–455 contains internal components including a CPU, memory and storage device, as illustrated in FIG. 2 with respect to the individual LAN stations.

Routing devices TR1–TR10 receive messages from the subnetworks to which they are connected, and forward the messages to different subnetworks. The RI field of the frame header specifies the destination station and, possibly, some path information as well; routing devices TR1–TR10 may utilize this path information to some extent (e.g., to update or verify internal routing topologies), but typically establish the path based on internally stored information.

Operation of the network 400 is monitored and managed by a network-management console workstation 460, which is equipped with appropriate software and hardware components to effect this conventional function. In particular, workstation 460 can check and change the status of various network resources, gather statistics concerning network traffic (i.e., the flow of messages through the various routing devices TR1–TR10), and transmit this information to the routing devices to effect the purposes of the present invention.

Figure 4B:
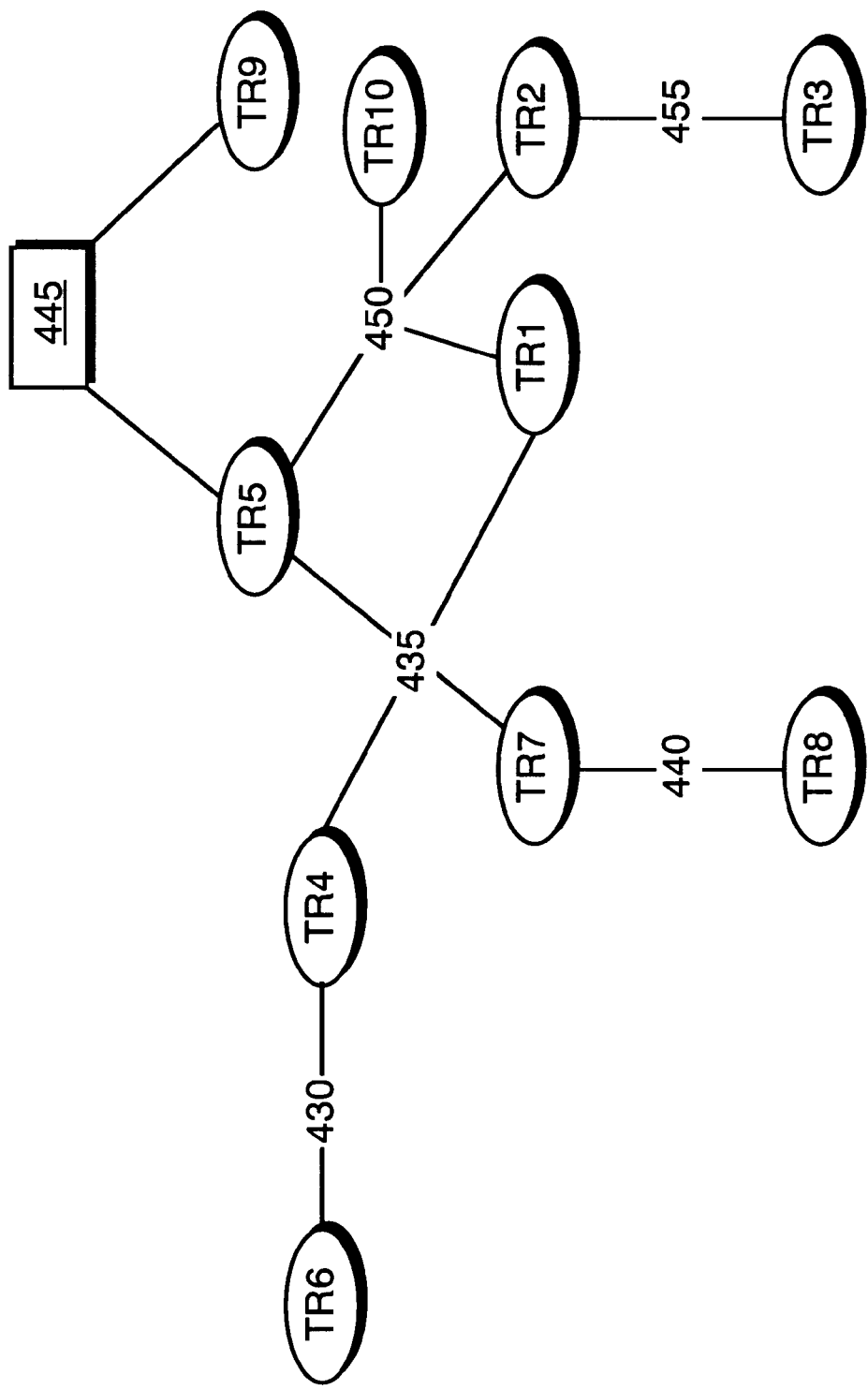
FIG. 4B is a map of of the network collection shown in FIG. 4A, arranged in accordance with the present invention.

Refer to FIG. 4B, which shows the manner in which the network shown in FIG. 4 may be represented in accordance with the present invention from the perspective of the routing device 445. This device is represented as the root of the illustrated tree structure, and the first-level links point to nodes representing subnetworks TR5, TR9, to which the device 445 is connected. Subsequent arcs emanating from the TR5, TR9 nodes correspond to the routing devices 435, 450 connected thereto, and these arcs therefore represent the bridge-implemented connections between subnetworks. As shown in FIG. 4B, the arcs can contain multiple limbs, each corresponding to a port on the routing device represented by the arc. For example, routing device 435 contains four ports connected to TR1, TR4, TR5, and TR7; in FIG. 4B, these are represented as four limbs collectively designated 435.

Using this structure, routing device 445 may undertake different operations associated with efficient routing of frames. Upon receiving a frame from a station on a connected subnetwork (e.g., TR9) and addressed to a station on a different subnetwork (e.g., TR1), device 445 may first identify a plurality of candidate routing paths (e.g., via device 435 or device 450). In one mode of operation, the database entries corresponding to candidate routing device have associated therewith a transmission cost, so that merely by inspection of the data structure, device 445 is able to determine the path having the smallest associated transmission cost. In another mode of operation, particularly applicable in a DLSW configuration, device 445 establishes a direct link to the candidate devices in order to gather real-time information concerning the transmission loads on these devices, their states of operation, etc. Based on information obtained therefrom, device 445 determines the optimal routing path, and sends the message to the next routing device in the path (e.g., in a DLSw configuration, over a TCP connection). For example, routing device 445 may be programmed to route frames to routing devices in a manner that balances transmission loads across the network, or simply to the candidate device with the lowest transmission burden.

Device 445 may also be instructed (e.g., by workstation 460) to analyze the data structure in order to identify potentially destructive loops within the network topology, and which are readily revealed by the topographical representation encoded by the data structure.

It should be stressed that, while the topology illustrated in FIG. 4B is organized as a tree structure, it is not ordinarily stored that way in the associated routing device 445. Instead, the routing database of device 445 represents the nodes and arcs as a data structure, e.g., ordered lists of nodes and arcs each linked to names of the components they specify. As a result, the movement or removal of entire subnetworks within the topology can be straightforwardly represented by movement or deletion of a single database entry.

It will therefore be seen that the foregoing represents a highly efficient approach to path determination in a network including path-determining routing devices. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A computer-readable medium embodying executable instructions for use in defining communication pathways in a computer network including a plurality of multicast subnetworks and a plurality of routing devices connecting the subnetworks, the instructions causing generation, in a source routing device, of a data structure defining pathways to at least some of the subnetworks, the data structure comprising:
   a. data specifying a root designating the source routing device;
   b. data specifying a plurality of nodes each designating a different subnetwork; and
   c. data specifying a plurality of arcs connecting the nodes, each arc corresponding to a routing device capable of transferring packets between the subnetworks designated by the nodes spanned by the arc, the source routing device being responsive to the data structure and selecting, based thereon, at least one routing path for transmission of address-bearing packets, the at least one path having a lowest associated cost or a smallest transmission load thereacross.

2. The medium of claim 1 wherein the packets comprise a header having a destination field, the instructions causing the source routing device to:
   a. determine, from the destination field, a destination subnetwork;
   b. select a routing path from the source routing device to the destination subnetwork in accordance with the data structure; and c. transmit the packet onto the network in accordance with the routing path.

3. The medium of claim 2 wherein the instructions further cause the routing device to balance transmission loads across other routing devices by:

a. determining a plurality of alternative paths in accordance with the data structure between the source routing device and the destination, each path comprising at least one routing device; and b. gathering statistics specifying transmission loads across the routing devices in the paths, the at least one path being selected on the basis of having a smallest transmission load thereacross.

4. The medium of claim 1 wherein the data specifying a node comprises a value representing a transmission cost associated with the node, the at least one path being selected with reference to transmission costs associated with nodes of the data structure.

5. The medium of claim 4 wherein the packets each comprise a header having a destination field, the instructions causing the source routing device to:

a. determine, from the destination field, a destination subnetwork;

b. identify a plurality of candidate routing paths from the source routing device to the destination subnetwork in accordance with the data structure;

c. identify a routing path having a lowest transmission cost; and d. transmit the packet onto the network in accordance with the routing path.

6. The medium of claim 1 wherein at least some of the routing devices represented in the data structure are bridges implementing data link switching.

7. The medium of claim 1 wherein at least some of the routing devices represented in the data structure are routers.

8. The medium of claim 1 wherein the instructions also cause analysis of the data structure to detect loops.

9. A routing device capable of defining communication pathways in a computer network including a plurality of multicast subnetworks and a plurality of other routing devices connecting the subnetworks, the routing device comprising:

a. at least one communication port connected to a subnetwork;

b. means for communicating with other routing devices;

c. a database comprising (i) data specifying a root designating the routing device, (ii) data specifying a plurality of nodes each designating a different subnetwork, and (iii) data specifying a plurality of arcs connecting the nodes, each arc corresponding to a routing device capable of transferring packets between the subnetworks designated by the nodes spanned by the arc; and d. means for selecting, based on the database, at least one routing path for transmitting packets received over the at least one communication port to the other routing devices, the at least one routine path having a lowest associated cost or a smallest transmission load thereacross.

10. The apparatus of claim 9 wherein the packets comprise a header having a destination field, the routing device selecting an optimal routing path comprising at least one of the other routing devices based on the destination field and the database, and transmitting the packet to a device in the routing path.

11. The apparatus of claim 10 wherein the routing device is configured to:

a. determine a plurality of alternative paths in accordance with the data structure to the destination, each path comprising at least one routing device; and b. gather statistics specifying transmission loads across the routing devices in the paths; and c. route the packet along the path having a smallest transmission load thereacross.

12. The apparatus of claim 9 wherein the data specifying a node comprises a value representing a transmission cost associated with the node.

13. The apparatus of claim 12 wherein the packets comprise a header having a destination field, the routing device being configured to:

a. determine, from the destination field, a destination subnetwork;

b. identify a plurality of candidate routing paths to the destination subnetwork in accordance with the data structure;

c. identify a routing path having a lowest transmission cost; and d. transmit the packet onto the network in accordance with the routing path.

14. The apparatus of claim 9 wherein the routing device is a bridge implementing data link switching.

15. The apparatus of claim 9 wherein the routing device is a router.

16. The apparatus of claim 9 wherein the routing device is configured to analyze the data structure to detect loops.

* * * * *